(12) United States Patent
Konno et al.

(10) Patent No.: US 7,641,990 B2
(45) Date of Patent: Jan. 5, 2010

(54) IRON COMPOUND PARTICLES AND MAGNETIC RECORDING MEDIUM USING SAME

(75) Inventors: Shinichi Konno, Honjou (JP); Toshihiko Ueyama, Okayama (JP); Kenichi Inoue, Hirosaki (JP); Takayuki Yoshida, Okayama (JP); Ken Inoue, Okayama (JP)

(73) Assignee: Dowa Electronics Materials Co., Ltd., Tokyo (JP)

( * ) Notice: Subject to any disclaimer, the term of this patent is extended or adjusted under 35 U.S.C. 154(b) by 488 days.

(21) Appl. No.: 11/473,065

(22) Filed: Jun. 23, 2006

(65) Prior Publication Data
US 2007/0009737 A1    Jan. 11, 2007

(30) Foreign Application Priority Data
Jun. 27, 2005    (JP)    ............................. 2005-185919

(51) Int. Cl.
*G11B 5/716*    (2006.01)
(52) U.S. Cl. ..................................... 428/840.2; 428/402
(58) Field of Classification Search ................. 423/263, 423/275, 579, 592, 592.1; 252/62.55, 62.56, 252/62.57; 428/840.2, 402, 831, 831.2, 832, 428/837, 840, 840.1, 845, 845.1, 845.5
See application file for complete search history.

(56) References Cited

U.S. PATENT DOCUMENTS

| 6,124,022 A | * | 9/2000 | Hayashi et al. | ............. 428/141 |
| 2005/0129945 A1 | * | 6/2005 | Matsumoto et al. | ......... 428/402 |

FOREIGN PATENT DOCUMENTS

| JP | 5-242455 | 9/1993 |
| JP | 6-60362 | 3/1994 |
| JP | 6-267059 | 9/1994 |
| JP | 9-170003 | 6/1997 |
| JP | 2000-143250 | 5/2000 |
| JP | 2001-160212 | 6/2001 |

OTHER PUBLICATIONS

Y. Sasaki, et al., "Effect of Under Layer on Surface Smoothness of Double Layered Metal Tapes", The Institute of Electronics, Technical Report of IEICE, vol. 95, No. 383. (MR95), Nov. 23, 1995, pp. 49-55.

* cited by examiner

*Primary Examiner*—Holly Rickman
*Assistant Examiner*—Lisa Chau
(74) *Attorney, Agent, or Firm*—Clark & Brody

(57) ABSTRACT

Non-magnetic powder of particles for non-magnetic lower layer applications is provided that enables a multilayer coating type magnetic recording medium having good surface smoothness to be obtained. The particles are iron compound particles having a long axis with a standard geometrical deviation, as obtained from a transmission electron microscope image, that is greater than 1.5, and a short axis with a standard geometrical deviation, as obtained from a TEM image, that is greater than 1.35. The iron compound particles may be hematite or iron oxyhydroxide.

11 Claims, No Drawings

IRON COMPOUND PARTICLES AND MAGNETIC RECORDING MEDIUM USING SAME

FIELD OF THE INVENTION

The present invention relates to iron compound particles suitable for use as a non-magnetic powder constituting the non-magnetic layer of a multilayer coating type magnetic recording medium, and to a magnetic recording medium using same.

DESCRIPTION OF THE PRIOR ART

Recent years have seen increasing demand for magnetic recording media with larger recording capacities and higher reliability. This has led to the development of magnetic tape having a multilayer structure in which a non-magnetic layer is provided on the base film as an intermediate layer (lower layer), on which is provided the magnetic layer upper layer), instead of the conventional tape structure in which the magnetic layer is provided directly on the base film. Because the multilayer structure improves the electromagnetic conversion characteristics, it makes higher recording densities possible. In addition, the durability and reliability of the tape are improved.

Home video tape is an example of a multilayer coating type magnetic recording medium in daily use. However, such media are now being particularly extensively used for data storage applications. With the amounts of data that need to be stored growing at a rapid pace, researchers are constantly endeavoring to record ever more information in the limited space available.

Possible ways of writing more data to the recording medium include increasing the number of tape windings and increasing the density of the medium. Increasing the number of windings requires a corresponding decrease in the thickness of the tape, and increasing the density of the medium requires a corresponding reduction in the size of the recording regions. To construct a multilayer coating type magnetic recording medium able to handle such increases, it is necessary to improve the performance of the magnetic material, and to improve the characteristics of the non-magnetic lower layer between the magnetic layer and the base film.

One of the important characteristics required of a lower layer is its surface smoothness when it is applied to the base film. Smoothing the surface of the lower layer increases the smoothness of the magnetic upper layer, thereby making it possible to realize a magnetic recording medium having excellent electromagnetic conversion characteristics, which is related to achieving higher recording densities. That smoothness of the magnetic layer depends on the non-magnetic particles constituting the non-magnetic layer located directly beneath the magnetic layer is something that is well-known from previous research (see, for example, Reference 7: Vol. 95, No. 383 (MR 95), pp. 49-55 of the Technology Research Reports of the Institute of Electronics, Information and Communication Engineers).

JP 2000-143250A (Reference 1) describes obtaining a lower layer having excellent surface smoothness by forming the lower layer of hematite particles with a particle size distribution in which the standard geometrical deviation σg of the long-axis diameter is not more than 1.5 and that of the short-axis diameter is not more than 1.3. JP 6-060362A (References 2) and JP 9-170003A (Reference 3) describe obtaining a magnetic recording medium having good surface smoothness by prescribing the standard geometrical deviation σg of the long-axis length. JP 2001-160212A (Reference 4) describes the formation of an under layer having excellent surface smoothness by degrading the particle size distribution of the lower non-magnetic layer by composing said layer of a mixture of two powders having different average long-axis particle lengths. JP 5-242455A (Reference 5) and JP 6-267059A (Reference 6) describe changing the particle size distribution by adding to the nor-magnetic layer some particle groups having two or more diameter sizes.

OBJECT OF THE INVENTION

To improve the surface smoothness of the magnetic recording medium, most of the conventional methods, starting with Reference 1, are directed towards particle uniformity. However, the resulting surface is still not smooth enough. That is to say, there are limits as to how much the smoothness can be improved by effecting uniformity of particle size distribution. As such, there is a need to use another method that provides drastic improvement. In the case of Reference 1, moreover, even when the standard geometrical deviation of the particle size is set to be not more than the specified value, in cases where the measured specific surface area is high compared to when the specific surface area approximated to the shape obtained from a transmission electron microscope (TEM) image is large (low density), the medium surface properties undergo a deterioration that is considered to be caused by the high viscosity thereof. Thus, the surface properties of the particles are also altered by the higher density of the particles, rather than by the coordination of the particle shape, which makes it difficult to say that this is an adequate disclosure of a method of improving the surface smoothness based on just the particle shape.

Reference 4 teaches that a small standard geometrical deviation is preferable with respect to each of the two or more particle types of the mixture, which would seem to mean that the standard geometrical deviation cannot be very large in the case of a mixture of two or more types of particles. With the technology of Reference 4, there is a large apparent standard geometrical deviation, but it cannot be definitively stated that the packing is therefore improved, so it cannot be said that the surface smoothness of the medium is improved.

The object of the present invention is to provide powder particles that, when used for the lower layer, provide a stable, marked improvement in the surface smoothness of a magnetic recording medium.

SUMMARY OF THE INVENTION

Based on the results of detailed studies, the present inventors found that the above object could be attained by means of powder particles in which, in the particle size distribution obtained from a TEM image, variations in long-axis length or short-axis length have been increased to a certain level. Specifically, the present invention provides iron compound comprising such particles as having a long axis with a standard geometrical deviation, as obtained from a TEM image, that is greater than 1.5, or a short axis with a standard geometrical deviation, as obtained from a TEM image, that is greater than 1.35. More preferably, the iron compound powder particles have a long axis with said standard geometrical deviation and also a short axis with said standard geometrical deviation. Thus the invention provides iron compound powder of particles having a standard geometrical deviation in a long axis of greater than 1.5 and a standard geometrical deviation in a short axis of greater than 1.35, wherein the standard geometrical deviations of the long and short axes are those obtained by the measurement of the long and short axes of the particles using a transmission electron microscope image of the particles.

The invention also provides said iron compound powder particles that, when L is the average length in nanometers (nm) of the long axis and D is the average length (nm) of the short axis, satisfy at least one of the following equations (1) and (2).

(Cumulative number of particles having a long-axis length of not more than $L/2$)/(cumulative number of particles having a long-axis length of not more than $2L$)$\geq 0.5$     (1)

(Cumulative number of particles having a short-axis length of not more than $D/2$)/(cumulative number of particles having a short-axis length of not more than $2D$)$\geq 0.5$     (2)

Ideally, the powder has a powder pH of less than 8 measured in accordance with the boiling method of JIS K5101, and are iron compound powder particles containing rare earth elements (including Y and Sc) or P. The iron compound particles may be hematite or iron oxyhydroxide. A powder comprised of such non-magnetic particles is suitable for use as the non-magnetic layer of a coating type magnetic recording medium.

In accordance with this invention, it is possible to stably improve the surface smoothness of the non-magnetic lower layer in a multilayer coating type magnetic recording medium, by appropriately prescribing distributions relating to the shape of the iron compound powder particles. As a result, the medium, following the formation of the magnetic upper layer, has improved surface smoothness, improving recording density and reliability.

PREFERRED EMBODIMENTS OF THE INVENTION

The iron compound powder particles of this invention have a standard geometrical deviation of the long axis and short axis calculated using long-axis and short-axis lengths obtained by using TEM images to measure the particle diameters as described hereinafter specifically. That is, they are iron compound powder particles that satisfy at least one of the following:

i) They have a long-axis standard geometrical deviation that is greater than 1.5;
ii) They have a short-axis standard geometrical deviation that is greater than 1.35.

A particle size distribution that broad is considered to be highly effective for improving the surface smoothness when the particles are applied as a coating. It is considered that the spaces between large particles being filled by the smaller particles improves the surface smoothness. If the particle size distribution is too large, the difference between the diameters of the large and small particles becomes too great, decreasing the filling effect. Therefore, the preferable standard geometrical deviation of the long axis is from greater than 1.5 to 3.0, and more preferably 1.6 to 2.5. Similarly, the preferable standard geometrical deviation of the short axis is from greater than 1.35 to 3.0, and more preferably 1.4 to 2.5.

As the particle size distribution, it is desirable that when L is the average length of the long axis (nm) and D is the average length of the short axis (nm), as obtained from a TEM image, that at least one of the following equations (1) and (2) be satisfied.

(Cumulative number of particles having a long-axis length of not more than $L/2$)/(cumulative number of particles having a long-axis length of not more than $2L$)$\geq 0.5$     (1)

(Cumulative number of particles having a short-axis length of not more than $D/2$)/(cumulative number of particles having a short-axis length of not more than $2D$)$\geq 0.5$     (2)

When equation (1) is not satisfied, the ratio of small particles will be too low, so most of the small particles will do nothing more than be buried in the spaces between large particles without filling the spaces, resulting in insufficient improvement in the surface smoothness, or even coarsening the surface. The same thing happens when equation (2) is not satisfied. Based on various studies, it is desirable that either equation (1) or equation (2) be satisfied. In the case of both equations, the term on the right side is preferably 0.55 or more, and more preferably 0.6 or more.

A powder of iron compound powder particles having this special particle size distribution can be obtained by crushing the compound to a powder. In the case of hematite particles, for example, iron oxyhydroxide is calcined in air, and the calcined hematite thus formed is mechanically crushed. However, not all of the particles are crushed. Instead, a set amount is crushed, with the ratio of the set amount being adjusted to adjust the particle size distribution. This makes possible the one-step manufacture of powder from the same lot that contains both fine particles and relatively coarse particles. Moreover, the particle size distribution can still be adjusted to a desired state even when the powdering method (apparatus) is changed. In this way, powder having the above-described special particle size distribution is obtained by the above operation.

While there is no particular limitation on the crushing implement used, to obtain the powder defined by this invention, it is preferable to use a hammer type fine-particle crusher or similar apparatus. Specific examples of such an apparatus include an atomizer, a pulverizer, a circoplex, a particle mill, a micron particle mill, and so forth. Among such apparatuses, an atomizer that can combine bladed powdering with swing hammer powdering, or a pulverizer that is equipped with just a swing hammer, is convenient for adjusting the particle size distribution.

It is also possible to use a compression crusher, which works by the application of pressure; of the various crushers that can be used, it is preferable to use a roll type powder crusher. Roller mills that use compressive force to generate a shearing effect, roll mills that use multiple rollers for compressive crushing, and other such apparatuses are ideal for the task. In the case of these apparatuses, a system is used whereby the compressive force is applied independently to samples, in some cases changing the characteristics of the particles. It is therefore better to use either hammer crushing or compression crushing, or to use both together, depending on the required characteristics.

To obtain the particles according to the invention, the crushing process should be repeated a plurality of times, with appropriate changes of conditions. As one method, for example, in the case of the crushing of particles that have been coarsely crushed, in the first pass not more than 80 mass % of the total is crushed, after which the particles are again mixed. Then, not more than 80 mass % of the total amount of particles thus mixed is again subjected to crushing, and the particles are again mixed. This powdering operation is performed a further plurality of times, each time powdering not more than 80 mass % of the total.

Another method that can be used to obtain particles having a large distribution of the particle size comprises increasing the particle size distribution from the iron oxyhydroxide formation stage. However, this can also degrade the shape of the particles. Because in the case of this invention, variations in particle shape are avoided in order to maintain the surface smoothness, this method is not used. Thus, a characteristic feature of the present invention is that it is not necessary to implement modifications from the iron oxyhydroxide formation stage in order to increase the particle size distribution.

For the sake of the magnetic recording medium, it is also preferable to provide the particles of the invention with the following characteristics.

The long-axis length is preferably 10 to 200 nm, more preferably 20 to 180 nm, and even more preferably 25 to 160 nm. Such a particle diameter is based on a consideration of particle dispersibility in the coating for a lower layer. If the particle diameter is smaller than 10 nm, it gives rise to agglomeration, degrading the surface properties of the medium. On the other hand, a larger particle diameter is also undesirable, since it increases the three-dimensional size of the particles, degrading the surface smoothness of the medium and adversely affecting the electromagnetic conversion characteristics.

The BET-method based specific surface area is preferably 30 to 250 $m^2/g$, more preferably 40 to 200 $m^2/g$, and even more preferably 50 to 150 $m^2/g$. A smaller BET value is likely to cause sintering between particles, which is undesirable since existence of such particles in the coating degrades surface smoothness. If such sintering becomes more advanced, the sintered particles in the applied coating show up as lumps that have a highly adverse effect on the surface smoothness of the medium. A larger BET value can cause considerable refining of particle size or large numbers of pores on the surface of the particles, or both. Refinement of particles can cause agglomeration, as described above, making it impossible to maintain the surface smoothness of the medium. A high pore count can result in bubbles in the coating, degrading the storage stability of the medium.

When hematite ($\alpha$-iron oxide) is used as the powder of the invention, the stearic acid adsorption amount (STA), which indicates the fatty acid adsorption amount, is preferably 0.01 to 3.0 $mg/m^2$, more preferably 0.01 to 2.0 $mg/m^2$, and even more preferably 0.01 to 1.0 $mg/m^2$. When iron oxyhydroxide is used as the powder of the invention, the STA is preferably 0.01 to 5.0 $mg/m^2$, more preferably 0.01 to 4.0 $mg/m^2$, and even more preferably 0.01 to 3.0 $mg/m^2$. When there is a high consumption of fatty acids, it is possible that when the particles are dispersed in the coating material there will be a neutralization reaction between particle surface and fatty acid. This means that when the medium is formed, added lubricating agents (fatty acids) are consumed by the neutralization reaction with the particles, losing the lubricating function. The result will be a deterioration of the storage stability of a magnetic recording medium with a high STA, rendering the medium unsuitable for data storage applications. That is to say, for the physical properties of the powder, a smaller STA is better.

In addition, the STA is an index of the particle surface hydrophobicity. A hydrophilic particle surface promotes the adsorption on the particles of water molecules having a large polarity, which is undesirable since it impedes the adsorption of resin on the particles, reducing the dispersibility of the particles. So for this reason too, a lower STA is better from the standpoint of good particle dispersibility.

The TAP density is preferably not less than 0.50 $g/cm^3$, more preferably not less than 0.60 $g/cm^3$. If the coating material is formed with a TAP density that is too low, it will degrade the surface smoothness of the medium, reducing the glossiness and other properties.

It is preferable for the powder to have a powder pH that is from a weak base to a weak acid. In studies of the resin conformability with respect to non-magnetic particles, its powder pH is an important factor; a change in the pH of the lower layer powder affects the adsorption behavior of the fatty acids in the resin. More specifically, fatty acids, called lubricating agents, are generally added to both coating materials containing and dispersing the lower layer powder and the magnetic upper layer powder used to manufacture a coating type magnetic recording medium. The lubricants have the effect of improving the durability of the tape by decreasing the interference between the applied coating film of the tape surface and the head. Because the lubricants used are fatty acids which generally are acidic, if the pH of the lower layer powder particles is on the alkaline side, the neutralization reaction with the acidic lubricants in the coating material rapidly proceeds, making it impossible for the lubricants to manifest their lubricating action. Therefore, it is desirable to adjust the surface properties of the lower layer particles to prevent the fatty acids from being adsorbed on the particles. Specifically, it is desirable to give the surface of the particles an acidic pH so it has the same surface characteristics as the fatty acids.

However, if the particles are too acidic, it will have a bad effect. A strongly acidic lower layer, for example, is undesirable since it will corrode the metallic magnetic particles of the upper layer, drastically reducing the storage stability of the medium. To balance the corrosive effect on the upper layer and other component substances, the powder pH is preferably 3 or more, and more preferably 4 or more. The present invention defines 3 to 9 as the preferable powder pH range of the lower layer particles, more preferably 3 to 7, and even more preferably 4 to 7.

Powder pH is measured by the boiling method of JIS K5101, which shows the methods of measuring the various properties of pigments. The boiling method is preferred as it enables the removal of carbon dioxide gas adsorbed on the surface of particles exposed to the atmosphere, making it possible to know the pH of just the particles themselves.

Moreover, in cases where iron oxyhydroxide covered with a phosphorus compound is calcined in order to produce the powder of the present invention, the powder particles that satisfy the above pH conditions can be readily obtained. This has the effect of improving compatibility (conformability) with the coating material and also improves the surface smoothness of the lower layer material, without degrading the action of the lubricants. The beneficial effect on tape durability has also been confirmed, so a phosphorus content can be described as being desirable part of the particle composition.

There are also other reasons why the characteristics of a medium are improved by the inclusion of phosphorus. When iron oxyhydroxide is calcined to form iron oxide, sintering between particles usually takes place, and there is a collapse in the shape of the particles themselves. Conventional methods of improving this situation include the use of sintering prevention agents, typically Al or Si compounds, which are contained in the iron oxyhydroxide or used to coat the particle surface. However, it was found that since the use of these methods in cases in which iron oxide is being obtained from iron oxyhydroxide leads to a collapse in shape, the shape of the original iron oxyhydroxide particles cannot be maintained. The independence of the particles can be readily ensured by adding P to impart a sintering-prevention effect, ensuring the surface smoothness of the medium that is produced. The addition of P is therefore highly effective.

Phosphorus compounds that can be used include orthophosphoric acid, metaphosphoric acid, diphosphoric acid and phosphates such as ammonium phosphate and ammonium dihydrogen phosphate. Regardless of the phosphorus compound used, 0.1 to 5.0 mass % is a good range for the element P content of the iron oxide, in terms of phosphorus coating amount. If the P content is less than 0.1 mass %, the phosphorus coating will not have a sufficient sintering-prevention effect, so particles will sinter together, making it impossible to obtain a lower layer having good surface smoothness, and the coating film will also not be strong enough. On the other hand, while a P content that exceeds 5.0 mass % will prevent sintering from taking place, the iron oxide particles will have a high specific surface area and be poorly dispersed in the coating material, making them unsuitable for lower layer applications. It is also undesirable because it will produce free phosphorus compounds during the film formation and the free phosphorus compounds will give rise to chemical reactions with components in the resin, producing phosphorus compounds with different compositions that can have an adverse effect on the storage stability of the coating film.

In this invention, the phosphorus compounds or a combination of phosphorus compounds and rare earth compounds may be used as coating agents to produce the lower layer powder of iron oxide in the process using a flat acicular iron oxyhydroxide as a starting material. Here, Y and Sc are also regarded as rare earth elements.

The compounds can be formed on the flat acicular iron oxyhydroxide by a method as follows. The method is to form flat acicular iron oxyhydroxide particles by forming a suspension containing colloidal ferric hydroxide at 10 to 90° C. by the addition to an aqueous ferric salt solution of an aqueous solution of alkali hydroxide equivalent to 1.0 to 3.5 the iron amount, followed by aging for 2 to 20 hours and hydrolysis. Then a suspension of iron oxyhydroxide thus hydrolyzed, is strongly stirred and under the strong stirring an aqueous solution containing a prescribed concentration of phosphorus is added thereto, and the stirring is continued for a prescribed length of time. Then, a prescribed amount of rare earth elements (under which Y and Sc are included) in an aqueous solution of sulfuric acid may be added. At this time too, strong stirring is used. It is preferable to stir for an extended period following said addition, since doing so improves the uniformity of particle adhesion.

In cases in which a method is used wherein a suspension containing colloidal ferrous hydroxide particles obtained by adding not less than an equivalent of an aqueous alkali hydroxide solution to an aqueous alkali ferrous salt solution, are oxidized at a pH of not less than 11 and a temperature of not more than 80° C. by passing an oxygen-containing gas therethrough, thereby forming an acicular iron oxyhydroxide, the same adhesion treatment of the compounds to the iron oxyhydroxide as mentioned above can be used. Specifically the suspensions containing iron oxyhydroxide after the oxidizing reaction, is strongly stirred and under the strong stirring an aqueous solution containing a prescribed concentration of phosphorus is added thereto, and the stirring is continued for a prescribed length of time. Then, a prescribed amount of rare earth elements (under which Y and Sc are included) in an aqueous solution of sulfuric acid may be added. At this time too, strong stirring is used.

Rare earth components may also be adhered by a process comprising adding into water a powder of iron oxyhydroxide prepared beforehand, stirring strongly the slurry obtained and adding the compound to the slurry under the stirring. However, because in that case the suspension is a pure water suspension, the solution is nearly neutral. Since in this case there is no formation of hydroxides during the adhesion of rare earth compounds, in some cases adhesion is not possible.

In such a case, it is necessary to proceed with the adhesion after first making the suspension alkaline by the addition of an appropriate alkali (alkali hydroxide or alkali carbonate).

There is no particular limitation on the rare earth elements that can be used, the effect of the invention being confirmable whatever the element used. However, the use of Y, La, Sc, Nd is preferred, since they provide a pronounced sintering-prevention effect by synergism with P. A suitable content of rare earth element (denoted by R) in the iron oxide, expressed in atomic percent (at %) of the iron, is one in which R/Fe is within the range 0.1 to 10 at %. A rare earth content of less than 0.1 at % is undesirable since it will not provide a sufficient sintering-prevention effect, so the lower layer will not have good surface smoothness and the coating film will not be strong enough. A rare earth content that exceeds 10 at % is similarly undesirable, since it makes it easier for particles to agglomerate and sinter together, degrading the surface properties.

In the prior art, attempts were made to improve the sinter-prevention effect by using Al and the like in solid solution inside the iron oxyhydroxide constituting the iron oxide precursor. However, other elements in the iron oxyhydroxide as solid solution tend to produce an upward shift in the dehydration temperature at which the iron oxide is formed from the iron oxyhydroxide, making it necessary to use a higher calcining temperature. By using phosphorus and rare earth elements in the iron oxyhydroxide used for the surface coating, dehydration proceeds from a lower temperature region, making it possible to reduce the calcining temperature. As a result, particle sintering is suppressed and particle shape is maintained.

Other elements (such as Al or Si, for example) that coexist in the solution used during the forming of the iron oxyhydroxide can impede the growth of the iron oxyhydroxide and cause the collapse in the shape of the iron oxyhydroxide, and the shape is not restored by the calcining. This can result in nonuniformity of particle shape. However, with the present invention there is no need to use doping with other elements in order to shape the iron oxyhydroxide, so the precursor iron oxyhydroxide has a well-balanced, acicular shape that is maintained even after the calcining, making it possible to obtain iron oxide particles having a well-balanced acicular shape.

The iron oxide particles thus obtained are prevented from sintering together, and therefore exhibit good dispersion in the resin component used to form the lower layer. Moreover, since the particles are acicular, when they are coated to form a tape, adjacent particles can readily overlap, facilitating the formation of a wide face. This produces a smooth surface and reduces the number of components oriented perpendicularly to the plane of the base film. In addition, the particles are closely arrayed in the tape plane, providing improved surface smoothness and tape strength. Also, the surface characteristics of the particles are further improved by the presence of phosphorus and rare earth elements on the particle surface, providing good dispersion in, and adhesion to, the resin, which also contributes to strengthening the coating film.

In the following, there are described examples of the magnetic particles that form the upper layer, coating composition and base film when the lower layer of the multilayer magnetic recording medium is formed using non-magnetic powder particles (hematite, for example) having the acicular or acicular-like shape according to the invention.

The upper magnetic layer is composed of acicular ferromagnetic particles containing 5 to 50 at % Co, 0.1 to 50 at % Al, 0.1 to 30 at % rare earth elements (including Y and Sc), up to 0.05 mass % periodic table group 1a elements (such as Li, Na, K) and up to 0.1 mass % periodic table group 2a elements (such as Mg, Ca, Sr, Ba), with the balance substantially of iron. The magnetic particles have an outer shell of oxide film preventing further oxidation and an acicular shape that satisfies the following shape conditions: an average long-axis length of 10 to 200 nm, a specific surface area as measured by the BET method of 30 to 150 m$^2$/g, and an X-ray crystallite diameter (Dx) of 5 to 20 nm, and the following magnetic characteristics: a coercive force (Hc) of 79.6 to 238.9 kA/m (1000 to 3000 Oe) and a saturation magnetization ($\sigma$s) of 10 to 200 Am$^2$/kg (10 to 200 emu/g).

The base film may be a polyester such as polyethylene terephthalate or polyethylene 2-6-naphthalate, a polyolefin such as polypropylene, a cellulose derivative such as cellulose triacetate or cellulose diacetate, or a plastic such as polyamide or polycarbonate.

The magnetic coating that forms the upper magnetic layer may be composed, for example, of 100 parts by weight of magnetic metal particles, 2 parts by weight of carbon black, 3 parts by weight of alumina, 12 parts by weight of vinyl chloride resin (MR-110), 8 parts by weight of polyurethane resin (UR-8200), 0.3 part by weight of stearic acid, 0.3 part by weight of acetyl acetone, 107 parts by weight of methyl ethyl ketone, and 107 parts by weight of cyclohexanon.

The non-magnetic coating that forms the lower non-magnetic layer may be composed, for example, of 80 parts by weight of acicular Fe$_2$O$_3$ (hematite) powder, 0.5 parts by weight of carbon black, 1 part by weight of alumina, 12 parts by weight of vinyl chloride resin (MR-110), 8 parts by weight of polyurethane resin (UR-8200), 90 parts by weight of methyl ethyl ketone, 90 parts by weight of cyclohexanon, and 100 parts by weight of toluene.

The magnetic and non-magnetic coating material of the upper layer and lower layer, respectively, are produced by blending the ingredients to achieve the prescribed composition, followed by kneading and dispersion using a kneader and a sandgrinder. While the wet-on-wet method is the preferred method of applying coating material onto the non-magnetic base, consisting of speedily applying the upper magnetic layer while the lower layer is still moist, other methods may be used. The wet-on-wet multilayer coating method is a publicly-known method.

EXAMPLES

Before describing the examples, the method of evaluating characteristic values using examples and comparative examples will be explained.

Long-Axis Length and Short-Axis Length of Particles

These were obtained by TEM examination. For this, 0.005 g of a measurement sample was dispersed in 10 mL of a 2% collodion solution and 1 or 2 drops of the dispersed solution were used to form a collodion film sample that was affixed to one side of the grid, left to dry, and reinforced by the application of carbon vapor.

A TEM (a JEM-2010 manufactured by JEOL Ltd.) was then used to examine the sample in the field of view at an acceleration voltage of 200 kV. A transmission electron micrograph was taken at a ×50,000 magnification, magnified vertically and horizontally to three times the size, and the long- and short-axis lengths of at least 500 particles shown in the micrograph were measured and averaged. The particles include separate particles, particles connected by sintering or intergrowth, overlapping particles and so on, so it was necessary to establish some reasonable standards beforehand with respect to the measurement of the particles. These standards were as follows.

Standard for Measuring Length of Long-Axis and Short-Axis

The long-axis length refers to the longest length in the longitudinal direction of the target particle. The short-axis length refers to the longest length across the width of the target particle.

The particles shown in the micrograph that were measured were selected using the following criteria.

1. Any particle that was partly out of the field of view was not measured.
2. Particles that had a clear outline and were on their own were measured.
3. Particles that were not acicular but were on their own and could be measured as independent particles were measured.
4. Adjacent particles that overlapped but had clearly defined boundaries that enabled the overall particle shape to be judged were each measured as an individual particle.
5. Adjacent particles that overlapped and did not have clearly defined boundaries that enabled the total shape of the particles to be judged were not measured, as it was decided the shape of the particles could not be determined.

The presence or absence of bonds between particles, that is, judging whether particles were overlapping or sintered was done as follows.

1. A plurality of micrographs having different focuses were prepared and boundary portions of particles judged from micrographs with well-defined fringes.
2. In the case of overlapping particles, portions where the particle outlines intersected were examined and the particles were judged to be sintered in cases where there was a rounding of the outlines of each particle at the intersection portion. When there was a point intersection between the outline of one particle that at an unrelated angle was unrelated to the outline of the other particle, they were judged to be simply overlapping.
3. When it was not clear whether there was a boundary or not, making judgement difficult, the particles were not judged to be sintered, but were measured as individual particles and estimated as large particles.

Standard Geometrical Deviation of Long Axis and Short Axis

Broadly speaking, there are two ways of calculating the standard geometrical deviation indicating the particle size distribution of the long-axis and short-axis lengths. In one, the axis lengths are converted into natural logarithms and the standard deviation thereof mechanically calculated, and in the other, the long-axis or short-axis lengths are plotted along the horizontal axis of standard logarithmic probability graph paper, and the cumulative number of individual particles along the vertical axis. In this case, the latter method was used. Specifically, the TEM micrographs of the particles were enlarged, the diameters (long-axis length and short-axis length) of the particles in the field of view are measured, and the magnification powers at the time the micrograph was taken and at the time it was enlarged are compared to calculate the actual particle diameters. Then, using statistical techniques, the diameters are plotted along the horizontal axis of standard logarithmic probability graph paper, and the cumulative number of particles (integral plus mesh) belonging to each particle category are plotted as a percentage along the vertical axis. Reading off from the graph the particle diameter values corresponding to 50% and 84.13%, respectively, of the number of particles showed a value calculated in accordance with the following equation:

Standard Geometrical Deviation=[particle diameter at an integral plus mesh of 84.13%]/[particle diameter (geometric average diameter) at an integral plus mesh of 50%].

Here, the long axis and short axis standard geometrical deviations are displayed as Lσg and Dσg, respectively.

Particle Size Distribution

The particle size distribution is produced on the basis of the above TEM-based long-axis length measurement data obtained in respect of 500 or more particles, as follows. Particle diameters are categorized in 0.5 nm increments and the number of particles in each category is calculated to obtain the percentage (%) of each category to the total number of particles measured, that is, to calculate diameter occurrence frequencies (%) in each category. The values of the left terms of equations (1) and (2) were obtained on the basis of this particle size distribution data in a long-axis length and a short-axis length. Below, these are called the X value and the Y value.

$X$ value=(Cumulative number of particles having a long-axis length of not more than $L/2$)/(cumulative number of particles having a long-axis length of not more than $2L$)

$Y$ value=(Cumulative number of particles having a short-axis length of not more than $D/2$)/(cumulative number of particles having a short-axis length of not more than $2D$)

Specific Surface Area

This was measured by the BET method.

TAP Density

This was measured by inserting the sample powder into a glass sample cell having a diameter of 5 mm and a height of 40 mm, and tapping it 200 times, using a tap height of 10 cm.

Stearic Acid Adsorption Amount (STA)

Sample powder was dispersed in a 2% stearic acid solution using MEK as solvent and centrifuged, causing the powder to sink to the bottom of the container, and the concentration of the supernatant was obtained to thereby calculate the adsorption amount of the stearic acid per specific surface area.

Viscosity of Coating Material

A viscometer (Model R110) manufactured by Toki Sangyo K. K. was used to measure the viscosity of non-magnetic coating material in which the sample powder was dispersed.

The coating material was applied to a base film to form a non-magnetic coating layer tape (semi-finished product) (hereinbelow referred to as "non-magnetic layer tape"), which was subjected to the following evaluations.

Surface Smoothness of the Non-Magnetic Layer Tape

Surface Roughness

A three-dimensional fine shape measuring machine (ET-30HK) manufactured by Kosaka Kenkyujo K. K. was used to measure the mean surface roughness Ra of the coating film surface. The Ra value was expressed in nanometers.

Glossiness

A glossmeter was used to measure the surface glossiness of the non-magnetic layer tape at an angle of 60 degrees.

Sliding Steel Ball

A non-magnetic layer tape sample was adhered to a glass plate with the coating film face upward, the glass plate was laid horizontally, a stainless steel ball having a diameter of 5 mm was placed on the coating film face of the tape, and the ball was subjected to a vertical loading of 5 g. Then, the glass plate was slid horizontally back and forth, 20 mm in each direction, at a low speed of 2320 mm/min, to measure the number of times the sliding took place before the coating peeled off.

Next, a magnetic layer (upper layer) was formed on the non-magnetic layer (lower layer) of the above non-magnetic layer tape to form a finished tape product that was subjected to the following evaluations.

Electromagnetic Conversion Characteristics

To measure the electromagnetic conversion characteristics, an interactive head and an MR head were attached to a drum tester, the interactive head was used for write operations and the MR head for replay. The recording input was a square wave amplified by a function generator, creating a digital signal that was recorded at a wavelength of 0.35 µm. The output from the MR head was amplified by a pre-amplifier and input to a spectrum analyzer. With C as the output of the 0.35 µm carrier value, the value of the output and a spectral component corresponding to at least the recording wavelength at the time the square wave was input is used to calculate, as an integration value, a value from which output and system noise is subtracted, and the calculated integration value is calculated as a particle noise Np value. Also, the difference between the two is used to calculate the carrier/particle noise ratio.

Sliding Steel Ball

This was measured by the same method described above with respect to the non-magnetic layer tape.

Young's Modulus

This was measured by the method of measuring the modulus of elasticity described in JIS-X-6172-2000 and elsewhere. Specifically, 102 mm of a sample tape that is at least 178 mm long is fixed and pulled at 5 mm/min by the fixing jig. The modulus is calculated based on the tensile force slope at 0% and when the tape is elongated 1%.

Surface Smoothness

This was measured by the same method, described above for a non-magnetic layer tape, used to measure surface roughness and glossiness. Surface roughness was also measured by the needle-contact method.

Surface Roughness According to the Needle-Contact Method

As described in JIS-X-6172-2000, measurement is done using a contact needle with a radius of 12.5 µm under a load of 20 mg, with a 254 µm cutoff. This corresponds to the "surface roughness expressed in µm units" shown in the tables below.

Cupping

As described in JIS-X-6172-2000, 1.0±0.1 mm of tape is cut off and the tape is suspended with both ends exposed to the atmosphere of the test environment, and left for at least 3 hours. A test sample 25 mm long is then cut from the middle of the tape. The sample is placed upright in a cylinder that is at least 25 mm high and has an inside diameter of 13.0±0.2 mm, which is stood in an optical comparator with the two ends aligned with the comparator crosshairs, and the distance from the crosshairs to the center of the sample is measured.

Elongation Load

This is obtained by the method described in JIS-X-6172-2000. This comprises conducting the measurement by means of a tensile testing machine that can display the load at a precision of 2%, and using a fixing jig to affix 102 mm of a tape test sample that is at least 178 mm long. The tape is elongated at the rate of 51 mm/min until it has been elongated by at least 10%. The tensile force at an elongation of 3% is used as the elongation load.

Example 1

Manufacturing Acicular Iron Oxyhydroxide 2000 g of pure water was put into a 5 L reaction vessel and maintained at 30° C. using a temperature controller, and 1000 g of an aqueous solution containing 4.50 mass % of ferrous sulfate was added thereto, and was followed by the addition of 1000 g of an aqueous solution containing 5 mass % of ammonium sulfate. This was followed by the addition of sodium carbonate amounting to 5.0 equivalents in terms of $CO_2/Fe$ conversion, the temperature of the mixture was elevated to 40.0° C. and air passed therethrough at the rate of 100 mL/min to effect core crystal formation. The temperature was then elevated to 47.0° C., and air continued to flow at 100 mL/min. After 90 minutes, 300 g of a Y solution (a solution of yttrium oxide dissolved in dilute sulfuric acid containing 2.5 mass % Y), and the reaction was continued to complete the oxidation. A small amount of the reaction filtrate was extracted as sampling, and after imparting hydrochloric acidity thereto, a small amount of potassium hexacyanoferrate solution was added and, after checking that the sampling solution did not undergo any change, the reaction was terminated.

Iron Oxyhydroxide Sintering Prevention Treatment

The iron oxyhydroxide obtained previously was filtered to separate the filtrate and obtain a cake, and 1.5 L of orthophosphoric acid diluted to a P concentration of 0.01 mol/L was added to the cake to obtain a slurry covered with phosphorus. This was followed by washing with 100 L or more of pure water and drying. The iron oxyhydroxide obtained was dried at 300° C., until the water content thereof amounted to 0.5 mass %, as measured by the Carl Fischer method, to thereby obtain P/Y-adhered iron oxide particles. Those dried particles at 300° C. were used in Examples 30-68 described hereinafter.

Treatment of Iron Oxide Particles to Obtain α-Iron Oxide

Then the particles were placed in a bucket through which air could be passed, which was then fixed into position inside a through type calcining furnace, in which the temperature was then raised to 590° C. at 60° C./min in a nitrogen atmosphere. The nitrogen flow was maintained while steam was added and adjusted to achieve a concentration of 5 vol % relative to the overall gas amount, and the particles were thus heated for 20 minutes to obtain α-iron oxide (the main component in hematite, $\alpha\text{-}Fe_2O_3$).

Powdering the α-Iron Oxide 100 g of the α-iron oxide (hematite) thus formed under the above conditions was then powdered, using a MKA-5J atomizer manufactured by Masukou Sangyo Co., Ltd. The total amount was powdered (referred to as first powdering pass), then 1/16 (6.3 g) of the total was taken out. Only the material of the 6.3 g taken out was again powdered (referred to as second powdering pass). From the same powdered material as after the first powdering pass, 1/16 (6.3 g) of the original total 100 g was taken out separately and powdered (referred to as third powdering pass). Furthermore, the material remaining after the first powdering pass was powdered (referred to as residual powdering pass). The three materials after the second, third and residual powdering passes were mixed throughout to almost total 100 g of the powder controlled in the particle size distribution.

Manufacturing the Coating Material of the Upper and Lower Layers

The coating material of the upper magnetic layer and lower non-magnetic layer having the following composition was prepared.

Coating Material of the Lower Magnetic Layer

Ferromagnetic metal particles (Co/Fe=24 (at %), coercive force Hc=160.8 kA/m, average long-axis length of 35 nm, crystallite size D110=12 nm, σs=102 A·m²/kg, Δσs=8%): 100 parts by mass;

Vinyl chloride copolymer (MR-555, manufactured by Zeon Corporation, Japan): 12 parts by mass;

Polyurethane resin (UR-8200, manufactured by Toyo Boseki K. K.): 8 parts;

$\alpha\text{-}Al_2O_3$ (alumina): 5 parts by mass;

Carbon black: 0.5 part;

Cyclohexanon, methyl ethyl ketone, toluene (mixture ratio of 1:1:1): 214 parts by mass;

Acetyl acetone: 0.3 part by mass;

Stearic acid n-butyl: 0.3 part by mass.

A mixture of the above 12 parts by mass of vinyl chloride copolymer and 8 parts by mass of polyurethane resin, and 194 parts by mass of a mixed solvent obtained by mixing cyclohexanon, methyl ethyl ketone and toluene were dispersed for 5 hours by a kneader. In addition, 20 parts by mass of the mixed solvent were mixed in and dispersed for a further 20 minutes, thereby producing the magnetic coating material.

Coating Material of the Lower Non-Magnetic Layer

Sample particles (acicular hematite, iron oxyhydroxide): 80 parts by mass;

Vinyl chloride copolymer (MR-555, manufactured by Zeon Corporation, Japan): 12 parts by mass;

Polyurethane resin (UR-8200, manufactured by Toyo Boseki K. K.): 8 parts by mass;

$\alpha\text{-}Al_2O_3$ (alumina): 1 part by mass;

Carbon black: 0.5 part by mass;

Cyclohexanon, methyl ethyl ketone, toluene (mixture ratio of 1:1:1): 280 parts by mass;

Stearic acid n-butyl: 0.3 part by mass.

A mixture of the above 12 parts by mass of vinyl chloride copolymer and 8 parts by mass of polyurethane resin, and a mixed solvent obtained by mixing cyclohexanon, methyl ethyl ketone and toluene were dispersed for 5 hours by a kneader. In addition, 20 parts of the mixed solvent were mixed in and dispersed for a further 20 minutes, thereby producing the non-magnetic coating material.

Manufacturing the Non-Magnetic Layer Tape (Semi-Finished Product)

An applicator was used to apply the coating material for the non-magnetic layer onto a polyethylene terephthalate base film, providing a coating film 7 μm thick that dries to a thickness of 3 μm, followed by calendering to thereby obtain a non-magnetic lower monolayer tape.

Manufacturing the Multilayer Coating Type Magnetic Recording Medium (Finished Magnetic Tape)

Before the above coating for the non-magnetic layer dried, the coating for the magnetic layer was formed thereon to a thickness that produced a dry thickness of 0.15 μm, and while both layers were still wet, they were passed through an orientation device to give them a longitudinal orientation, using an orientation magnet setting of 5500 kilogauss. Then, a calendering apparatus that uses metal rolls was used to obtain the magnetic tape.

Evaluation of Characteristics

Samples of the non-magnetic particles obtained had the following characteristics.

Long-axis length: 40 nm

TAP density: 0.69 g/cm$^3$

Standard geometrical deviation of long axis: 1.98

Standard geometrical deviation of short axis: 1.53

X value: 0.73

Y value: 0.64

Other characteristics of the sample powders, together with characteristics relating to the tapes manufactured using each powder, are listed in Table 1 and Table 4.

Example 2

Except that ⅛ (12.6 g) of the original total 100 g was taken out separately in order to be treated in the third powdering pass, the same procedure as that of Example 1 was used.

Samples of the non-magnetic particles obtained had the following characteristics.

Long-axis length: 43 nm

TAP density: 0.73 g/cm$^3$

Standard geometrical deviation of long axis: 1.87

Standard geometrical deviation of short axis: 1.51

X value: 0.68

Y value: 0.62

Other characteristics of the sample powders, together with characteristics relating to the tapes manufactured using each powder, are listed in Table 1 and Table 4.

Example 3

Except that ¹⁄₁₆ of the total was taken out to be treated in the second powdering pass, ¼ of the total was taken out to be treated in the third powdering pass and the remainder of the material (¹¹⁄₁₆) after first powdering pass was treated in the residual powdering pass, the same procedure as that of Example 1 was used.

Samples of the non-magnetic particles obtained had the following characteristics.

Long-axis length: 49 nm

TAP density: 0.63 g/cm$^3$

Standard geometrical deviation of long axis: 1.72

Standard geometrical deviation of short axis: 1.52

X value: 0.63

Y value: 0.57

Other characteristics of the sample powders, together with characteristics relating to the tapes manufactured using each powder, are listed in Table 1 and Table 4.

Examples 4 to 12

Except that the proportions of the total taken out to be treated in the second, third and residual powdering passes were those listed in Table 1, the same procedure as that of Example 1 was used. In Table 1, "First take-out", "Second take-out" and "Residual" mean the proportions to be treated in the second, third and residual powdering pass, respectively, for Examples 1-24.

Examples 13 to 24

The procedure of the Examples 1 to 12 was repeated, except that a roll crusher was used instead of an impact mill. The characteristics of the sample powders, together with characteristics relating to the tapes manufactured using each powder, are listed in Table 1 and Table 4.

Examples 25 to 29

The same procedure of that of Example 1 was repeated, except that in the first pass, the total amount was powdered using an impact mill, and a roll crusher was used in the subsequent passes, using the conditions shown in Table 1. The characteristics of the sample powders, together with characteristics relating to the tapes manufactured using each powder, are listed in Table 1 and Table 4. In those cases, the column "First take-out" means the proportion treated in the first powdering pass, "Second take-out" means the proportion treated in the second powering pass, and "Residual" means the treatment of the remaining powder.

Examples 30 to 68

The same procedure of that of Examples 1 to 29 was repeated, except that the material subjected to the powdering was iron oxyhydroxide particles that were not calcined, as explained in Example 1. The characteristics of the sample powders, together with characteristics relating to the tapes manufactured using each powder, are listed in Tables 2 and 5.

Comparative Example 1

The same procedure as that of Example 1 was used, except that all of the material was powdered in a single pass. Samples of the non-magnetic particles obtained had the following characteristics.

Long-axis length: 93 nm

TAP density: 0.58 g/cm$^3$

Standard geometrical deviation of long axis: 1.07

Standard geometrical deviation of short axis: 1.23

X value: 0.48

Y value: 0.49

Other characteristics of the sample powders, together with characteristics relating to the tapes manufactured using each powder, are listed in Tables 3 and 6.

Comparative Example 2

The same procedure as that of Example 1 was used, except that all of the material was powdered in a two passes. That is to say the second powdering pass was done using all of the material after the first powdering pass using all of the material. Samples of the non-magnetic particles obtained had the following characteristics.

Long-axis length: 75 nm

TAP density: 0.55 g/cm$^3$

Standard geometrical deviation of long axis: 1.05

Standard geometrical deviation of short axis: 1.23

X value: 0.36

Y value: 0.48

Other characteristics of the sample powders, together with characteristics relating to the tapes manufactured using each powder, are listed in Tables 3 and 6.

Comparative Example 3

The same procedure as that of Example 1 was used, except that all of the material was powdered in a three passes. That is to say the third powdering pass was done using all of the material after the second powdering pass using all of the material, and the second powdering pass was done using all of the material after the first powdering pass using all of the material. The characteristics of the sample powders, together with characteristics relating to the tapes manufactured using each powder, are listed in Tables 3 and 6.

Comparative Examples 3 to 18

The same procedure as that of Example 1 was used, except that the conditions of the first and second take-out and residual in the powdering passes were as shown in the Table 3. In the table, the powdering conditions of Comparative Examples 10-12 are the same as those described in Comparative Examples 1-3 respectively. The characteristics of the sample powders, together with characteristics relating to the tapes manufactured using each powder, are listed in Tables 3 and 6.

Comparative Examples 19 to 36

The same procedures as that of Comparative Examples 1 to 18 were repeated, except that the material subjected to the powdering passes was iron oxyhydroxide particles that were the same as those of Examples 30 to 68, and that were not calcined. The characteristics of the sample powders, together with characteristics relating to the tapes manufactured using each powder, are listed in Tables 3 and 6.

TABLE 1

| Example | Particle Material | Crushing Machine Impact Mill | Crushing Machine Roll Crusher | Amount Crushed (all being 100) First take out | Amount Crushed (all being 100) Second take out | Amount Crushed (all being 100) Residual | Particle Shape Characteristics L(nm) | Particle Shape Characteristics L$\sigma_g$ | Particle Shape Characteristics D(nm) | Particle Shape Characteristics D$\sigma_g$ | Particle Shape Characteristics L/D | Particle Shape Characteristics L2/2L ※1 | Particle Shape Characteristics D2/2D ※2 | Particle Characteristics BET (m$^2$/g) | Particle Characteristics Measured STA (mg/g) | Particle Characteristics STA (mg/m$^2$) |
|---|---|---|---|---|---|---|---|---|---|---|---|---|---|---|---|---|
| 1 | α-Fe$_2$O$_3$ | ○ | | 6.3 | 6.3 | 87.5 | 40 | 1.98 | 9 | 1.53 | 4.4 | 0.73 | 0.64 | 86.8 | 42.5 | 0.49 |
| 2 | α-Fe$_2$O$_3$ | ○ | | 6.3 | 12.5 | 81.3 | 43 | 1.87 | 9 | 1.51 | 4.8 | 0.68 | 0.62 | 86.4 | 44.9 | 0.52 |
| 3 | α-Fe$_2$O$_3$ | ○ | | 6.3 | 25.0 | 68.8 | 49 | 1.72 | 10 | 1.52 | 4.9 | 0.63 | 0.57 | 84.6 | 46.5 | 0.55 |
| 4 | α-Fe$_2$O$_3$ | ○ | | 6.3 | 50.0 | 43.8 | 60 | 1.68 | 11 | 1.53 | 5.5 | 0.60 | 0.51 | 78.3 | 48.5 | 0.62 |
| 5 | α-Fe$_2$O$_3$ | ○ | | 12.5 | 6.3 | 81.3 | 48 | 1.92 | 10 | 1.52 | 4.8 | 0.58 | 0.54 | 89.6 | 43.0 | 0.48 |
| 6 | α-Fe$_2$O$_3$ | ○ | | 12.5 | 12.5 | 75.0 | 51 | 1.87 | 10 | 1.56 | 5.1 | 0.55 | 0.54 | 85.4 | 43.1 | 0.51 |
| 7 | α-Fe$_2$O$_3$ | ○ | | 12.5 | 25.0 | 62.5 | 56 | 1.76 | 11 | 1.50 | 5.1 | 0.51 | 0.59 | 86.9 | 46.9 | 0.54 |
| 8 | α-Fe$_2$O$_3$ | ○ | | 25.0 | 6.3 | 68.8 | 63 | 1.83 | 12 | 1.51 | 5.3 | 0.58 | 0.55 | 83.8 | 37.7 | 0.45 |
| 9 | α-Fe$_2$O$_3$ | ○ | | 25.0 | 12.5 | 62.5 | 66 | 1.69 | 12 | 1.54 | 5.5 | 0.57 | 0.56 | 78.5 | 38.5 | 0.49 |
| 10 | α-Fe$_2$O$_3$ | ○ | | 25.0 | 25.0 | 50.0 | 71 | 1.52 | 13 | 1.56 | 5.5 | 0.54 | 0.55 | 74.9 | 39.3 | 0.53 |
| 11 | α-Fe$_2$O$_3$ | ○ | | 37.5 | 6.3 | 56.3 | 78 | 1.79 | 14 | 1.53 | 5.6 | 0.53 | 0.56 | 73.2 | 31.1 | 0.43 |
| 12 | α-Fe$_2$O$_3$ | ○ | | 37.5 | 12.5 | 50.0 | 81 | 1.61 | 14 | 1.48 | 5.8 | 0.54 | 0.53 | 74.6 | 34.3 | 0.46 |
| 13 | α-Fe$_2$O$_3$ | | ○ | 6.3 | 6.3 | 87.5 | 50 | 1.83 | 8 | 1.73 | 6.3 | 0.62 | 0.61 | 81.3 | 45.9 | 0.57 |
| 14 | α-Fe$_2$O$_3$ | | ○ | 6.3 | 12.5 | 81.3 | 52 | 1.77 | 11 | 1.70 | 4.7 | 0.65 | 0.55 | 80.2 | 47.7 | 0.60 |
| 15 | α-Fe$_2$O$_3$ | | ○ | 6.3 | 25.0 | 68.8 | 58 | 1.69 | 12 | 1.68 | 4.8 | 0.58 | 0.56 | 78.3 | 51.7 | 0.66 |
| 16 | α-Fe$_2$O$_3$ | | ○ | 6.3 | 50.0 | 43.8 | 68 | 1.62 | 14 | 1.67 | 4.9 | 0.52 | 0.55 | 74.4 | 54.7 | 0.74 |
| 17 | α-Fe$_2$O$_3$ | | ○ | 12.5 | 6.3 | 81.3 | 55 | 1.88 | 11 | 1.68 | 5.0 | 0.51 | 0.56 | 78.3 | 41.1 | 0.53 |
| 18 | α-Fe$_2$O$_3$ | | ○ | 12.5 | 12.5 | 75.0 | 58 | 1.78 | 12 | 1.66 | 4.8 | 0.55 | 0.55 | 76.8 | 44.9 | 0.59 |
| 19 | α-Fe$_2$O$_3$ | | ○ | 12.5 | 25.0 | 62.5 | 63 | 1.67 | 13 | 1.63 | 4.8 | 0.58 | 0.58 | 78.1 | 48.0 | 0.62 |
| 20 | α-Fe$_2$O$_3$ | | ○ | 25.0 | 6.3 | 68.8 | 65 | 1.79 | 13 | 1.64 | 5.0 | 0.55 | 0.52 | 78.9 | 39.5 | 0.50 |
| 21 | α-Fe$_2$O$_3$ | | ○ | 25.0 | 12.5 | 62.5 | 68 | 1.67 | 13 | 1.62 | 5.2 | 0.54 | 0.55 | 78.4 | 46.6 | 0.60 |
| 22 | α-Fe$_2$O$_3$ | | ○ | 25.0 | 25.0 | 50.0 | 73 | 1.51 | 13 | 1.45 | 5.6 | 0.56 | 0.51 | 68.4 | 43.4 | 0.64 |
| 23 | α-Fe$_2$O$_3$ | | ○ | 37.5 | 6.3 | 56.3 | 76 | 1.73 | 13 | 1.57 | 5.8 | 0.55 | 0.57 | 66.8 | 31.1 | 0.47 |
| 24 | α-Fe$_2$O$_3$ | | ○ | 37.5 | 12.5 | 50.0 | 78 | 1.58 | 13 | 1.54 | 6.0 | 0.57 | 0.55 | 67.4 | 33.0 | 0.49 |
| 25 | α-Fe$_2$O$_3$ | ○ | ○ | 100※ | 10 | 90 | 55 | 1.57 | 9 | 1.49 | 6.1 | 0.55 | 0.60 | 81.2 | 47.9 | 0.59 |
| 26 | α-Fe$_2$O$_3$ | ○ | ○ | 100※ | 20 | 80 | 68 | 1.69 | 11 | 1.53 | 6.2 | 0.62 | 0.58 | 76.3 | 46.5 | 0.61 |
| 27 | α-Fe$_2$O$_3$ | ○ | ○ | 100※ | 30 | 70 | 77 | 1.83 | 13 | 1.52 | 5.9 | 0.55 | 0.55 | 73.8 | 46.9 | 0.64 |
| 28 | α-Fe$_2$O$_3$ | ○ | ○ | 100※ | 40 | 60 | 89 | 1.92 | 14 | 1.62 | 6.4 | 0.57 | 0.55 | 68.8 | 45.4 | 0.66 |
| 29 | α-Fe$_2$O$_3$ | ○ | ○ | 100※ | 50 | 50 | 98 | 1.84 | 16 | 1.54 | 6.1 | 0.54 | 0.53 | 63.4 | 43.1 | 0.68 |
| 30 | α-Fe$_2$O$_3$ | ○ | ○ | 10 | 90 | 100※ | 48 | 1.98 | 4 | 1.89 | 12.0 | 0.51 | 0.54 | 77.3 | 55.3 | 0.72 |
| 31 | α-Fe$_2$O$_3$ | ○ | ○ | 20 | 80 | 100※ | 62 | 1.95 | 6 | 1.85 | 10.3 | 0.55 | 0.55 | 74.8 | 35.5 | 0.48 |
| 32 | α-Fe$_2$O$_3$ | ○ | ○ | 30 | 70 | 100※ | 73 | 1.84 | 7 | 1.83 | 10.4 | 0.56 | 0.55 | 72.4 | 37.3 | 0.52 |
| 33 | α-Fe$_2$O$_3$ | ○ | ○ | 40 | 60 | 100※ | 85 | 1.72 | 8 | 1.82 | 10.6 | 0.57 | 0.57 | 67.3 | 36.7 | 0.55 |
| 34 | α-Fe$_2$O$_3$ | ○ | ○ | 50 | 50 | 100※ | 94 | 1.67 | 9 | 1.42 | 10.4 | 0.52 | 0.58 | 61.2 | 34.9 | 0.57 |

※Indicates use of roll crusher

※1: Denotes (cumulative number of particles having a long-axis length of not more than L/2)/(cumultive number of particles having a long-axis length of not more than 2L)

※2: Denotes (cumulative number of particles having a short-axis length of not more than D/2)/(cumultive number of particles having a short-axis length of not more than 2D)

TABLE 2

| Example | Particle Material | Crushing Machine Impact Mill | Crushing Machine Roll Crusher | Amount Crushed (all being 100) First take out | Amount Crushed (all being 100) Second take out | Amount Crushed (all being 100) Residual | Particle Shape Characteristics L(nm) | Particle Shape Characteristics $L\sigma_g$ | Particle Shape Characteristics D(nm) | Particle Shape Characteristics $D\sigma_g$ | Particle Shape Characteristics L/D | Particle Shape Characteristics L2/2L ※1 | Particle Shape Characteristics D2/2D ※2 | Particle Characteristics BET ($m^2$/g) | Particle Characteristics Measured STA (mg/g) | STA (mg/$m^2$) |
|---|---|---|---|---|---|---|---|---|---|---|---|---|---|---|---|---|
| 35 | α-FeOOH | ○ | | 6.3 | 6.3 | 87.5 | 46 | 1.97 | 11 | 1.55 | 4.2 | 0.61 | 0.61 | 56.4 | 82.9 | 1.47 |
| 36 | α-FeOOH | ○ | | 6.3 | 12.5 | 81.3 | 49 | 1.86 | 11 | 1.53 | 4.5 | 0.58 | 0.57 | 54.6 | 85.2 | 1.56 |
| 37 | α-FeOOH | ○ | | 6.3 | 25.0 | 68.8 | 55 | 1.73 | 12 | 1.54 | 4.6 | 0.56 | 0.55 | 54.3 | 89.6 | 1.65 |
| 38 | α-FeOOH | ○ | | 6.3 | 50.0 | 43.8 | 67 | 1.62 | 12 | 1.51 | 5.6 | 0.53 | 0.54 | 53.7 | 99.9 | 1.86 |
| 39 | α-FeOOH | ○ | | 12.5 | 6.3 | 81.3 | 54 | 1.92 | 11 | 1.50 | 4.9 | 0.58 | 0.58 | 54.7 | 78.8 | 1.44 |
| 40 | α-FeOOH | ○ | | 12.5 | 12.5 | 75.0 | 59 | 1.88 | 11 | 1.54 | 5.4 | 0.55 | 0.54 | 54.2 | 82.1 | 1.52 |
| 41 | α-FeOOH | ○ | | 12.5 | 25.0 | 62.5 | 62 | 1.83 | 12 | 1.52 | 5.2 | 0.54 | 0.55 | 53.9 | 87.3 | 1.62 |
| 42 | α-FeOOH | ○ | | 25.0 | 6.3 | 68.8 | 68 | 1.87 | 13 | 1.49 | 5.2 | 0.55 | 0.57 | 53.4 | 72.1 | 1.35 |
| 43 | α-FeOOH | ○ | | 25.0 | 12.5 | 62.5 | 72 | 1.75 | 14 | 1.56 | 5.1 | 0.57 | 0.58 | 53.0 | 77.9 | 1.47 |
| 44 | α-FeOOH | ○ | | 25.0 | 25.0 | 50.0 | 78 | 1.62 | 13 | 1.54 | 6.0 | 0.54 | 0.57 | 52.6 | 82.8 | 1.58 |
| 45 | α-FeOOH | ○ | | 37.5 | 6.3 | 56.3 | 85 | 1.85 | 14 | 1.55 | 6.1 | 0.51 | 0.50 | 51.9 | 66.2 | 1.28 |
| 46 | α-FeOOH | ○ | | 37.5 | 12.5 | 50.0 | 89 | 1.78 | 14 | 1.50 | 6.4 | 0.53 | 0.51 | 51.6 | 71.2 | 1.38 |
| 47 | α-FeOOH | | ○ | 6.3 | 6.3 | 87.5 | 56 | 1.82 | 10 | 1.72 | 5.6 | 0.60 | 0.55 | 55.9 | 94.8 | 1.70 |
| 48 | α-FeOOH | | ○ | 6.3 | 12.5 | 81.3 | 59 | 1.75 | 12 | 1.68 | 4.9 | 0.61 | 0.56 | 56.4 | 100.7 | 1.79 |
| 49 | α-FeOOH | | ○ | 6.3 | 25.0 | 68.8 | 63 | 1.68 | 13 | 1.69 | 4.8 | 0.55 | 0.51 | 56.9 | 112.7 | 1.98 |
| 50 | α-FeOOH | | ○ | 6.3 | 50.0 | 43.8 | 74 | 1.60 | 15 | 1.65 | 4.9 | 0.58 | 0.55 | 57.3 | 126.3 | 2.21 |
| 51 | α-FeOOH | | ○ | 12.5 | 6.3 | 81.3 | 61 | 1.89 | 12 | 1.67 | 5.1 | 0.55 | 0.51 | 56.7 | 89.3 | 1.58 |
| 52 | α-FeOOH | | ○ | 12.5 | 12.5 | 75.0 | 64 | 1.81 | 13 | 1.64 | 4.9 | 0.54 | 0.56 | 57.1 | 100.2 | 1.76 |
| 53 | α-FeOOH | | ○ | 12.5 | 25.0 | 62.5 | 67 | 1.70 | 13 | 1.65 | 5.2 | 0.55 | 0.51 | 55.3 | 102.0 | 1.85 |
| 54 | α-FeOOH | | ○ | 25.0 | 6.3 | 68.8 | 72 | 1.77 | 14 | 1.64 | 5.1 | 0.56 | 0.57 | 54.9 | 82.4 | 1.50 |
| 55 | α-FeOOH | | ○ | 25.0 | 12.5 | 62.5 | 75 | 1.65 | 15 | 1.47 | 5.0 | 0.51 | 0.56 | 53.8 | 96.0 | 1.79 |
| 56 | α-FeOOH | | ○ | 25.0 | 25.0 | 50.0 | 79 | 1.49 | 13 | 1.53 | 6.1 | 0.58 | 0.50 | 53.2 | 101.3 | 1.91 |
| 57 | α-FeOOH | | ○ | 37.5 | 6.3 | 56.3 | 82 | 1.71 | 13 | 1.57 | 6.3 | 0.53 | 0.58 | 52.7 | 73.5 | 1.40 |
| 58 | α-FeOOH | | ○ | 37.5 | 12.5 | 50.0 | 85 | 1.60 | 14 | 1.56 | 6.1 | 0.54 | 0.54 | 52.5 | 77.2 | 1.47 |
| 59 | α-FeOOH | ○ | ○ | 100※ | 10 | 90 | 61 | 1.55 | 11 | 1.51 | 5.5 | 0.60 | 0.58 | 57.5 | 101.8 | 1.77 |
| 60 | α-FeOOH | ○ | ○ | 100※ | 20 | 80 | 73 | 1.67 | 13 | 1.55 | 5.6 | 0.58 | 0.54 | 56.9 | 104.1 | 1.83 |
| 61 | α-FeOOH | ○ | ○ | 100※ | 30 | 70 | 82 | 1.80 | 15 | 1.54 | 5.5 | 0.55 | 0.56 | 53.3 | 101.5 | 1.91 |
| 62 | α-FeOOH | ○ | ○ | 100※ | 40 | 60 | 93 | 1.89 | 13 | 1.60 | 7.2 | 0.54 | 0.57 | 51.8 | 102.6 | 1.98 |
| 63 | α-FeOOH | ○ | ○ | 100※ | 50 | 50 | 104 | 1.84 | 19 | 1.52 | 5.5 | 0.52 | 0.54 | 50.8 | 103.6 | 2.04 |
| 64 | α-FeOOH | ○ | ○ | 10 | 90 | 100※ | 57 | 1.96 | 5 | 1.91 | 11.4 | 0.50 | 0.55 | 57.8 | 124.0 | 2.15 |
| 65 | α-FeOOH | ○ | ○ | 20 | 80 | 100※ | 69 | 1.95 | 8 | 1.85 | 8.6 | 0.51 | 0.57 | 55.8 | 79.5 | 1.43 |
| 66 | α-FeOOH | ○ | ○ | 30 | 70 | 100※ | 78 | 1.82 | 9 | 1.82 | 8.7 | 0.51 | 0.58 | 54.9 | 84.8 | 1.55 |
| 67 | α-FeOOH | ○ | ○ | 40 | 60 | 100※ | 91 | 1.74 | 10 | 1.80 | 9.1 | 0.53 | 0.55 | 52.3 | 85.5 | 1.64 |
| 68 | α-FeOOH | ○ | ○ | 50 | 50 | 100※ | 99 | 1.69 | 11 | 1.43 | 9.0 | 0.54 | 0.54 | 51.2 | 87.6 | 1.71 |

※Indicates use of roll crusher
※1: Denotes (cumulative number of particles having a long-axis length of not more than L/2)/(cumultive number of particles having a long-axis length of not more than 2L)
※2: Denotes (cumulative number of particles having a short-axis length of not more than D/2)/(cumultive number of particles having a short-axis length of not more than 2D)

TABLE 3

| Comparative Example | Particle Material | Crushing Machine Impact Mill | Crushing Machine Roll Crusher | Amount Crushed (all being 100) First take out | Amount Crushed (all being 100) Second take out | Amount Crushed (all being 100) Residual | Particle Shape Characteristics L(nm) | Particle Shape Characteristics $L\sigma_g$ | Particle Shape Characteristics D(nm) | Particle Shape Characteristics $D\sigma_g$ | Particle Shape Characteristics L/D | Particle Shape Characteristics L2/2L ※1 | Particle Shape Characteristics D2/2D ※2 | Particle Characteristics BET ($m^2$/g) | Particle Characteristics Measured STA (mg/g) | STA (mg/$m^2$) |
|---|---|---|---|---|---|---|---|---|---|---|---|---|---|---|---|---|
| 1 | α-Fe$_2$O$_3$ | ○ | | 100.0 | 0.0 | 0.0 | 93 | 1.07 | 20 | 1.23 | 4.7 | 0.48 | 0.49 | 45.8 | 38.0 | 0.83 |
| 2 | α-Fe$_2$O$_3$ | ○ | | 100.0 | 100.0 | 0.0 | 75 | 1.05 | 12 | 1.20 | 6.3 | 0.36 | 0.48 | 65.9 | 73.8 | 1.12 |
| 3 | α-Fe$_2$O$_3$ | ○ | | 100.0 | 100.0 | 100.0 | 49 | 1.04 | 9 | 1.14 | 5.4 | 0.51 | 0.46 | 78.9 | 97.0 | 1.23 |
| 4 | α-Fe$_2$O$_3$ | ○ | | 50.0 | 25.0 | 25.0 | 88 | 1.15 | 16 | 1.17 | 5.5 | 0.51 | 0.48 | 52.3 | 48.1 | 0.92 |
| 5 | α-Fe$_2$O$_3$ | ○ | | 75.0 | 12.5 | 12.5 | 98 | 1.24 | 18 | 1.15 | 5.4 | 0.50 | 0.47 | 47.6 | 40.9 | 0.86 |
| 6 | α-Fe$_2$O$_3$ | ○ | | 50.0 | 12.5 | 37.5 | 96 | 1.47 | 16 | 1.22 | 6.0 | 0.50 | 0.47 | 50.7 | 47.7 | 0.94 |
| 7 | α-Fe$_2$O$_3$ | ○ | | 12.5 | 50.0 | 37.5 | 68 | 1.42 | 12 | 1.34 | 5.7 | 0.51 | 0.45 | 63.8 | 72.1 | 1.13 |
| 8 | α-Fe$_2$O$_3$ | ○ | | 25.0 | 50.0 | 25.0 | 83 | 1.43 | 14 | 1.30 | 5.9 | 0.49 | 0.45 | 52.3 | 49.2 | 0.94 |
| 9 | α-Fe$_2$O$_3$ | ○ | | 37.5 | 25.0 | 37.5 | 86 | 1.45 | 14 | 1.34 | 6.1 | 0.48 | 0.48 | 52.1 | 50.5 | 0.97 |
| 10 | α-Fe$_2$O$_3$ | | ○ | 100.0 | 0.0 | 0.0 | 97 | 1.08 | 20 | 1.05 | 4.9 | 0.49 | 0.50 | 46.9 | 46.0 | 0.98 |
| 11 | α-Fe$_2$O$_3$ | | ○ | 100.0 | 100.0 | 0.0 | 84 | 1.05 | 10 | 1.03 | 8.4 | 0.48 | 0.49 | 51.8 | 60.6 | 1.17 |
| 12 | α-Fe$_2$O$_3$ | | ○ | 100.0 | 100.0 | 100.0 | 54 | 1.04 | 8 | 1.02 | 6.8 | 0.46 | 0.47 | 74.8 | 95.7 | 1.28 |
| 13 | α-Fe$_2$O$_3$ | | ○ | 50.0 | 25.0 | 25.0 | 94 | 1.22 | 22 | 1.15 | 4.3 | 0.48 | 0.49 | 50.7 | 49.2 | 0.97 |
| 14 | α-Fe$_2$O$_3$ | | ○ | 75.0 | 12.5 | 12.5 | 97 | 1.13 | 16 | 1.08 | 6.1 | 0.47 | 0.48 | 48.3 | 44.9 | 0.93 |
| 15 | α-Fe$_2$O$_3$ | | ○ | 50.0 | 12.5 | 37.5 | 89 | 1.24 | 11 | 1.25 | 8.1 | 0.48 | 0.47 | 51.8 | 50.8 | 0.98 |
| 16 | α-Fe$_2$O$_3$ | | ○ | 12.5 | 50.0 | 37.5 | 73 | 1.28 | 11 | 1.37 | 6.6 | 0.49 | 0.51 | 52.8 | 61.8 | 1.17 |
| 17 | α-Fe$_2$O$_3$ | | ○ | 25.0 | 50.0 | 25.0 | 84 | 1.30 | 15 | 1.34 | 5.6 | 0.46 | 0.50 | 52.5 | 53.6 | 1.02 |

TABLE 3-continued

| Comparative Example | Particle Material | Crushing Machine Impact Mill | Crushing Machine Roll Crusher | Amount Crushed (all being 100) First take out | Amount Crushed (all being 100) Second take out | Amount Crushed (all being 100) Residual | L(nm) | Lσ_g | D(nm) | Dσ_g | L/D | L2/2L ※1 | D2/2D ※2 | BET (m²/g) | Measured STA (mg/g) | STA (mg/m²) |
|---|---|---|---|---|---|---|---|---|---|---|---|---|---|---|---|---|
| 18 | α-Fe₂O₃ | | ○ | 37.5 | 25.0 | 37.5 | 87 | 1.32 | 14 | 1.38 | 6.2 | 0.49 | 0.51 | 53.2 | 55.9 | 1.05 |
| 19 | α-FeOOH | ○ | | 100.0 | 0.0 | 0.0 | 95 | 1.05 | 23 | 1.15 | 4.1 | 0.50 | 0.48 | 47.8 | 80.3 | 1.68 |
| 20 | α-FeOOH | ○ | | 100.0 | 100.0 | 0.0 | 79 | 1.04 | 14 | 1.13 | 5.6 | 0.51 | 0.49 | 57.6 | 106.3 | 1.85 |
| 21 | α-FeOOH | ○ | | 100.0 | 100.0 | 100.0 | 53 | 1.06 | 9 | 1.12 | 5.9 | 0.55 | 0.48 | 68.7 | 94.8 | 1.38 |
| 22 | α-FeOOH | ○ | | 50.0 | 25.0 | 25.0 | 82 | 1.13 | 16 | 1.15 | 5.1 | 0.54 | 0.49 | 47.3 | 61.0 | 1.29 |
| 23 | α-FeOOH | ○ | | 75.0 | 12.5 | 12.5 | 93 | 1.19 | 18 | 1.13 | 5.2 | 0.52 | 0.47 | 42.9 | 60.5 | 1.41 |
| 24 | α-FeOOH | ○ | | 50.0 | 12.5 | 37.5 | 84 | 1.42 | 16 | 1.18 | 5.3 | 0.51 | 0.49 | 47.5 | 80.5 | 1.70 |
| 25 | α-FeOOH | ○ | | 12.5 | 50.0 | 37.5 | 75 | 1.37 | 12 | 1.21 | 6.3 | 0.50 | 0.49 | 53.8 | 75.9 | 1.41 |
| 26 | α-FeOOH | ○ | | 25.0 | 50.0 | 25.0 | 89 | 1.36 | 14 | 1.25 | 6.4 | 0.49 | 0.48 | 49.3 | 71.7 | 1.46 |
| 27 | α-FeOOH | ○ | | 37.5 | 25.0 | 37.5 | 94 | 1.42 | 14 | 1.22 | 6.7 | 0.48 | 0.49 | 47.4 | 69.7 | 1.47 |
| 28 | α-FeOOH | | ○ | 100.0 | 0.0 | 0.0 | 98 | 1.05 | 20 | 1.13 | 4.9 | 0.48 | 0.50 | 45.3 | 79.5 | 1.76 |
| 29 | α-FeOOH | | ○ | 100.0 | 100.0 | 0.0 | 87 | 1.03 | 10 | 1.02 | 8.7 | 0.49 | 0.51 | 49.5 | 95.0 | 1.92 |
| 30 | α-FeOOH | | ○ | 100.0 | 100.0 | 100.0 | 54 | 1.02 | 8 | 1.02 | 6.8 | 0.50 | 0.49 | 67.9 | 98.8 | 1.46 |
| 31 | α-FeOOH | | ○ | 50.0 | 25.0 | 25.0 | 89 | 1.19 | 22 | 1.11 | 4.0 | 0.48 | 0.48 | 49.2 | 68.6 | 1.40 |
| 32 | α-FeOOH | | ○ | 75.0 | 12.5 | 12.5 | 97 | 1.12 | 16 | 1.07 | 6.1 | 0.49 | 0.49 | 45.8 | 67.3 | 1.47 |
| 33 | α-FeOOH | | ○ | 50.0 | 12.5 | 37.5 | 94 | 1.28 | 11 | 1.19 | 8.5 | 0.47 | 0.50 | 48.2 | 84.6 | 1.76 |
| 34 | α-FeOOH | | ○ | 12.5 | 50.0 | 37.5 | 79 | 1.30 | 11 | 1.32 | 7.2 | 0.49 | 0.51 | 52.7 | 80.6 | 1.53 |
| 35 | α-FeOOH | | ○ | 25.0 | 50.0 | 25.0 | 87 | 1.32 | 15 | 1.28 | 5.8 | 0.47 | 0.50 | 50.1 | 78.9 | 1.58 |
| 36 | α-FeOOH | | ○ | 37.5 | 25.0 | 37.5 | 93 | 1.39 | 14 | 1.32 | 6.6 | 0.46 | 0.49 | 48.2 | 50.6 | 1.05 |

※1: Denotes (cumulative number of particles having a long-axis length of not more than L/2)/(cumultive number of particles having a long-axis length of not more than 2L)
※2: Denotes (cumulative number of particles having a short-axis length of not more than D/2)/(cumultive number of particles having a short-axis length of not more than 2D)

TABLE 4

| | Lower Monolayer Characteristics | | | | Characteristics of Multilayer Magnetic Recording Medium | | | | | | | |
|---|---|---|---|---|---|---|---|---|---|---|---|---|
| Example | Coating Viscosity (cp) | Surface Roughness (nm) | Glossiness (%) | Sliding Steel Ball (Count) | Output (dB) | C/N (dB) | Sliding Steel Ball (Count) | Young's Modulus (n/mm²) | Surface Roughness (nm) | Surface Roughness (μm) | Cupping (mm) | Elongation Load(N) |
| 1 | 62 | 15.0 | 189 | 1532 | +1.2 | +2.3 | 1624 | 5232 | 12.8 | 0.005 | 1.47 | 7.8 |
| 2 | 58 | 15.9 | 184 | 1423 | +1.1 | +1.9 | 1538 | 5175 | 13.8 | 0.006 | 1.49 | 8.2 |
| 3 | 56 | 16.3 | 179 | 1365 | +1.0 | +1.5 | 1464 | 5078 | 13.9 | 0.006 | 1.45 | 8.5 |
| 4 | 53 | 16.7 | 177 | 1230 | +1.0 | +1.7 | 1328 | 5023 | 14.1 | 0.006 | 1.40 | 8.7 |
| 5 | 48 | 17.2 | 170 | 1556 | +0.9 | +1.9 | 1623 | 5289 | 14.3 | 0.006 | 1.38 | 7.5 |
| 6 | 45 | 17.4 | 169 | 1483 | +1.0 | +1.8 | 1548 | 5178 | 14.8 | 0.007 | 1.31 | 8.4 |
| 7 | 42 | 17.9 | 171 | 1387 | +1.1 | +2.0 | 1423 | 5099 | 14.9 | 0.007 | 1.43 | 8.2 |
| 8 | 48 | 17.4 | 167 | 1474 | +0.9 | +1.8 | 1521 | 5188 | 15.1 | 0.007 | 1.42 | 7.5 |
| 9 | 38 | 18.3 | 157 | 1167 | +0.7 | +1.3 | 1253 | 5096 | 15.3 | 0.008 | 1.47 | 9.0 |
| 10 | 35 | 18.5 | 152 | 1098 | +0.3 | +0.4 | 1167 | 4986 | 15.5 | 0.008 | 1.45 | 9.3 |
| 11 | 44 | 17.6 | 165 | 1389 | +0.5 | +0.7 | 1421 | 5106 | 15.4 | 0.008 | 1.47 | 8.4 |
| 12 | 43 | 17.7 | 164 | 1288 | +0.4 | +0.9 | 1346 | 5069 | 15.3 | 0.008 | 1.53 | 8.8 |
| 13 | 52 | 16.6 | 178 | 1443 | +1.1 | +1.8 | 1522 | 5166 | 13.9 | 0.006 | 1.29 | 8.5 |
| 14 | 47 | 17.5 | 167 | 1387 | +1.0 | +1.9 | 1413 | 5123 | 15.8 | 0.007 | 1.33 | 8.1 |
| 15 | 42 | 17.9 | 164 | 1233 | +0.9 | +1.3 | 1327 | 5098 | 15.9 | 0.007 | 1.34 | 8.9 |
| 16 | 38 | 18.2 | 162 | 1197 | +0.7 | +1.1 | 1265 | 5085 | 16.2 | 0.008 | 1.37 | 9.0 |
| 17 | 54 | 16.8 | 175 | 1487 | +1.0 | +1.2 | 1534 | 5201 | 14.3 | 0.006 | 1.38 | 8.2 |
| 18 | 50 | 17.0 | 172 | 1324 | +0.9 | +1.3 | 1427 | 5093 | 14.2 | 0.005 | 1.37 | 8.7 |
| 19 | 46 | 17.3 | 169 | 1248 | +1.0 | +1.4 | 1346 | 5023 | 14.9 | 0.007 | 1.42 | 8.9 |
| 20 | 52 | 16.9 | 173 | 1354 | +0.8 | +1.2 | 1468 | 5103 | 14.5 | 0.006 | 1.41 | 8.4 |
| 21 | 48 | 17.5 | 166 | 1238 | +0.9 | +1.4 | 1347 | 5032 | 14.8 | 0.007 | 1.43 | 8.8 |
| 22 | 37 | 18.2 | 163 | 1012 | +0.8 | +1.3 | 1187 | 5004 | 16.2 | 0.008 | 1.52 | 9.4 |
| 23 | 48 | 17.4 | 169 | 1343 | +1.1 | +1.6 | 1428 | 5098 | 15.7 | 0.006 | 1.58 | 8.5 |
| 24 | 42 | 17.8 | 167 | 1121 | +1.0 | +1.3 | 1298 | 5067 | 16.2 | 0.008 | 1.53 | 9.1 |
| 25 | 37 | 17.5 | 172 | 1105 | +0.8 | +1.1 | 1267 | 5023 | 14.9 | 0.007 | 1.55 | 9.0 |
| 26 | 40 | 17.2 | 175 | 1241 | +0.9 | +1.4 | 1323 | 5078 | 14.7 | 0.006 | 1.54 | 8.7 |
| 27 | 46 | 17.0 | 179 | 1389 | +0.7 | +1.5 | 1437 | 5167 | 14.4 | 0.006 | 1.55 | 8.4 |
| 28 | 52 | 16.5 | 182 | 1498 | +1.0 | +1.6 | 1587 | 5226 | 13.2 | 0.005 | 1.43 | 8.0 |
| 29 | 48 | 17.0 | 171 | 1378 | +0.9 | +1.7 | 1426 | 5208 | 14.8 | 0.006 | 1.55 | 8.2 |
| 30 | 54 | 16.2 | 183 | 1582 | +1.2 | +2.5 | 1698 | 5389 | 14.1 | 0.005 | 1.25 | 7.7 |
| 31 | 51 | 16.3 | 181 | 1524 | +1.4 | +2.1 | 1629 | 5326 | 14.3 | 0.006 | 1.28 | 7.9 |
| 32 | 50 | 16.5 | 174 | 1392 | +0.8 | +1.5 | 1498 | 5167 | 14.0 | 0.005 | 1.25 | 8.3 |
| 33 | 45 | 17.4 | 169 | 1273 | +0.7 | +1.3 | 1376 | 5088 | 14.5 | 0.006 | 1.29 | 8.7 |
| 34 | 42 | 17.9 | 163 | 1219 | +0.8 | +1.5 | 1323 | 5021 | 14.7 | 0.006 | 1.53 | 8.8 |

TABLE 5

| | Lower Monolayer Characteristics | | | Characteristics of Multilayer Magnetic Recording Medium | | | | | | | | |
|---|---|---|---|---|---|---|---|---|---|---|---|---|
| Example | Coating Viscosity (cp) | Surface Roughness (nm) | Glossiness (%) | Sliding Steel Ball (Count) | Output (dB) | C/N (dB) | Sliding Steel Ball (Count) | Young's Modulus (n/mm$^2$) | Surface Roughness (nm) | Surface Roughness (μm) | Cupping (mm) | Elongation Load(N) |
| 35 | 73 | 11.8 | 203 | 1682 | +1.6 | +3.2 | 1721 | 7123 | 9.3 | 0.004 | 1.30 | 6.6 |
| 36 | 63 | 11.9 | 198 | 1523 | +1.4 | +2.2 | 1672 | 7023 | 9.4 | 0.006 | 1.35 | 6.9 |
| 37 | 62 | 12.1 | 195 | 1497 | +1.3 | +1.7 | 1534 | 6952 | 9.5 | 0.005 | 1.38 | 7.4 |
| 38 | 64 | 13.0 | 190 | 1434 | +1.2 | +1.9 | 1621 | 6823 | 9.7 | 0.006 | 1.40 | 7.6 |
| 39 | 54 | 12.6 | 193 | 1459 | +1.2 | +2.1 | 1634 | 6923 | 9.6 | 0.005 | 1.41 | 6.4 |
| 40 | 57 | 12.3 | 195 | 1489 | +1.3 | +2.0 | 1645 | 6945 | 9.5 | 0.004 | 1.28 | 7.3 |
| 41 | 53 | 12.2 | 197 | 1502 | +1.4 | +2.2 | 1664 | 7002 | 9.4 | 0.004 | 1.38 | 7.1 |
| 42 | 56 | 12.9 | 194 | 1498 | +1.3 | +2.1 | 1652 | 6932 | 9.6 | 0.005 | 1.39 | 6.2 |
| 43 | 47 | 13.5 | 187 | 1413 | +1.1 | +1.6 | 1576 | 6785 | 9.8 | 0.006 | 1.34 | 7.6 |
| 44 | 46 | 13.3 | 189 | 1428 | +0.7 | +1.0 | 1589 | 6798 | 9.7 | 0.006 | 1.29 | 7.9 |
| 45 | 59 | 12.5 | 196 | 1500 | +1.0 | +1.3 | 1624 | 6976 | 9.5 | 0.004 | 1.32 | 7.4 |
| 46 | 55 | 12.7 | 194 | 1483 | +0.9 | +1.4 | 1602 | 6953 | 9.6 | 0.005 | 1.42 | 7.5 |
| 47 | 60 | 12.6 | 194 | 1502 | +1.3 | +2.1 | 1683 | 6984 | 10.2 | 0.005 | 1.07 | 7.4 |
| 48 | 58 | 13.0 | 185 | 1412 | +1.2 | +2.2 | 1536 | 6801 | 10.5 | 0.006 | 1.09 | 7.1 |
| 49 | 54 | 13.1 | 186 | 1418 | +1.1 | +1.7 | 1549 | 6823 | 10.6 | 0.007 | 1.12 | 7.5 |
| 50 | 53 | 13.3 | 188 | 1423 | +0.9 | +1.3 | 1565 | 6843 | 10.7 | 0.007 | 1.15 | 7.6 |
| 51 | 62 | 12.4 | 197 | 1524 | +1.3 | +1.7 | 1628 | 6998 | 10.1 | 0.007 | 1.14 | 7.2 |
| 52 | 64 | 12.6 | 194 | 1499 | +1.2 | +1.6 | 1589 | 6982 | 10.3 | 0.008 | 1.16 | 7.7 |
| 53 | 55 | 12.9 | 192 | 1494 | +1.3 | +1.8 | 1578 | 6963 | 10.5 | 0.007 | 1.21 | 7.9 |
| 54 | 57 | 12.5 | 195 | 1501 | +1.1 | +1.7 | 1585 | 6990 | 10.4 | 0.008 | 1.23 | 7.4 |
| 55 | 54 | 13.1 | 185 | 1372 | +1.3 | +1.9 | 1498 | 6812 | 10.7 | 0.007 | 1.22 | 7.8 |
| 56 | 48 | 12.8 | 187 | 1483 | +0.9 | +1.3 | 1589 | 6831 | 10.6 | 0.008 | 1.44 | 8.0 |
| 57 | 54 | 13.0 | 183 | 1418 | +1.3 | +1.9 | 1523 | 6812 | 10.6 | 0.008 | 1.31 | 7.4 |
| 58 | 58 | 12.9 | 184 | 1427 | +1.2 | +1.8 | 1552 | 6823 | 10.6 | 0.007 | 1.35 | 8.0 |
| 59 | 46 | 13.0 | 186 | 1435 | +1.1 | +1.4 | 1578 | 6805 | 10.5 | 0.008 | 1.43 | 7.9 |
| 60 | 51 | 12.3 | 197 | 1523 | +1.2 | +1.5 | 1627 | 6994 | 9.9 | 0.007 | 1.38 | 7.4 |
| 61 | 58 | 12.0 | 201 | 1623 | +0.9 | +1.5 | 1704 | 7087 | 9.7 | 0.006 | 1.39 | 7.1 |
| 62 | 59 | 11.6 | 212 | 1682 | +1.2 | +1.7 | 1723 | 7232 | 9.5 | 0.005 | 1.23 | 6.9 |
| 63 | 53 | 12.5 | 197 | 1521 | +1.1 | +1.8 | 1653 | 7013 | 9.8 | 0.007 | 1.39 | 7.1 |
| 64 | 62 | 11.3 | 217 | 1756 | +1.4 | +3.4 | 1878 | 7323 | 9.1 | 0.004 | 0.99 | 6.4 |
| 65 | 64 | 11.5 | 215 | 1720 | +1.7 | +3.6 | 1829 | 7243 | 9.2 | 0.004 | 1.02 | 6.8 |
| 66 | 62 | 12.6 | 195 | 1568 | +1.4 | +2.1 | 1634 | 6985 | 9.6 | 0.006 | 1.05 | 7.0 |
| 67 | 53 | 13.1 | 183 | 1478 | +1.2 | +1.8 | 1567 | 6834 | 10.6 | 0.008 | 1.06 | 7.4 |
| 68 | 67 | 13.5 | 178 | 1422 | +1.1 | +1.7 | 1534 | 6769 | 10.9 | 0.008 | 1.47 | 7.5 |

TABLE 6

| | Lower Monolayer Characteristics | | | Characteristics of Multilayer Magnetic Recording Medium | | | | | | | | |
|---|---|---|---|---|---|---|---|---|---|---|---|---|
| | Coating Viscosity (cp) | Surface Roughness (nm) | Glossiness (%) | Sliding Steel Ball (Count) | Output (dB) | C/N (dB) | Sliding Steel Ball (Count) | Young's Modulus (n/mm$^2$) | Surface Roughness (nm) | Surface Roughness (μm) | Cupping (mm) | Elongation Load(N) |
| Comparative Example (Lower Layer: α-Fe$_2$O$_3$) | | | | | | | | | | | | |
| 1 | 54 | 19.6 | 138 | 983 | −0.3 | −0.1 | 1018 | 4329 | 16.8 | 0.013 | 3.19 | 10.8 |
| 2 | 52 | 19.7 | 136 | 974 | −0.5 | −0.2 | 942 | 4214 | 16.3 | 0.010 | 3.21 | 10.9 |
| 3 | 55 | 19.7 | 135 | 962 | −0.7 | −0.4 | 938 | 4383 | 16.5 | 0.012 | 3.23 | 11.0 |
| 4 | 50 | 19.4 | 142 | 995 | −0.2 | +0.1 | 1023 | 4423 | 16.2 | 0.010 | 2.84 | 10.5 |
| 5 | 28 | 19.2 | 146 | 1023 | 0.0 | 0.0 | 1129 | 4679 | 16.3 | 0.011 | 2.83 | 10.2 |
| 6 | 52 | 18.4 | 152 | 1088 | +0.2 | +0.3 | 1124 | 4874 | 15.8 | 0.009 | 2.82 | 9.7 |
| 7 | 56 | 18.6 | 150 | 1073 | +0.1 | +0.2 | 1094 | 4705 | 15.3 | 0.009 | 2.79 | 9.9 |
| 8 | 51 | 18.8 | 148 | 1054 | +0.1 | +0.2 | 1105 | 4729 | 15.2 | 0.008 | 2.71 | 9.9 |
| 9 | 49 | 18.9 | 147 | 1043 | +0.2 | +0.3 | 1114 | 4768 | 15.4 | 0.009 | 2.68 | 9.8 |
| 10 | 53 | 19.8 | 134 | 958 | −0.1 | −0.4 | 973 | 4314 | 16.4 | 0.012 | 3.20 | 10.7 |
| 11 | 51 | 19.9 | 130 | 928 | −0.3 | −0.5 | 952 | 4253 | 16.5 | 0.013 | 3.25 | 10.9 |
| 12 | 54 | 19.9 | 131 | 934 | −0.5 | −0.7 | 963 | 4209 | 16.5 | 0.014 | 3.24 | 11.1 |
| 13 | 48 | 19.4 | 141 | 992 | −0.1 | +0.1 | 1018 | 4584 | 15.9 | 0.012 | 2.88 | 10.3 |
| 14 | 46 | 19.7 | 135 | 964 | −0.1 | +0.1 | 1029 | 4398 | 16.2 | 0.011 | 2.92 | 10.2 |
| 15 | 50 | 19.5 | 137 | 980 | −0.1 | +0.2 | 1024 | 4463 | 15.8 | 0.009 | 2.87 | 10.5 |
| 16 | 53 | 19.3 | 140 | 975 | +0.1 | +0.2 | 1013 | 4492 | 15.4 | 0.008 | 2.84 | 10.4 |
| 17 | 48 | 19.1 | 142 | 989 | +0.0 | +0.3 | 994 | 4583 | 15.2 | 0.008 | 2.75 | 10.3 |
| 18 | 47 | 19.0 | 145 | 1004 | −0.1 | +0.3 | 1052 | 4623 | 14.9 | 0.007 | 2.72 | 10.2 |

TABLE 6-continued

| | Lower Monolayer Characteristics | | | | Characteristics of Multilayer Magnetic Recording Medium | | | | | | | |
|---|---|---|---|---|---|---|---|---|---|---|---|---|
| | Coating Viscosity (cp) | Surface Roughness (nm) | Glossiness (%) | Sliding Steel Ball (Count) | Output (dB) | C/N (dB) | Sliding Steel Ball (Count) | Young's Modulus (n/mm$^2$) | Surface Roughness (nm) | Surface Roughness (μm) | Cupping (mm) | Elongation Load(N) |
| Comparative Example (Lower Layer: α-FeOOH) | | | | | | | | | | | | |
| 19 | 56 | 17.4 | 144 | 1023 | −0.1 | +0.1 | 1142 | 4492 | 15.2 | 0.008 | 2.68 | 10.2 |
| 20 | 55 | 17.5 | 142 | 1014 | −0.3 | +0.1 | 1120 | 4443 | 15.3 | 0.009 | 2.74 | 10.3 |
| 21 | 57 | 17.3 | 140 | 993 | −0.4 | −0.2 | 1029 | 4564 | 15.0 | 0.008 | 2.76 | 10.8 |
| 22 | 52 | 17.1 | 146 | 1042 | +0.0 | +0.3 | 1178 | 4672 | 14.3 | 0.007 | 2.64 | 9.9 |
| 23 | 51 | 17.0 | 150 | 1108 | +0.2 | +0.4 | 1324 | 4823 | 14.2 | 0.007 | 2.60 | 10.3 |
| 24 | 53 | 16.8 | 156 | 1142 | +0.3 | +0.5 | 1362 | 4969 | 14.0 | 0.006 | 2.48 | 9.4 |
| 25 | 55 | 16.4 | 153 | 1124 | +0.2 | +0.4 | 1223 | 4828 | 13.8 | 0.006 | 2.52 | 9.5 |
| 26 | 52 | 16.6 | 150 | 1113 | +0.3 | +0.5 | 1424 | 4859 | 14.1 | 0.007 | 2.48 | 9.6 |
| 27 | 51 | 16.7 | 149 | 1107 | +0.2 | +0.4 | 1413 | 4863 | 14.3 | 0.007 | 2.45 | 9.5 |
| 28 | 54 | 17.6 | 142 | 982 | +0.2 | +0.4 | 1124 | 4523 | 15.2 | 0.008 | 2.66 | 10.4 |
| 29 | 53 | 17.7 | 140 | 963 | +0.1 | +0.3 | 1068 | 4476 | 15.4 | 0.009 | 2.55 | 10.6 |
| 30 | 55 | 17.8 | 139 | 970 | −0.1 | +0.2 | 1092 | 4414 | 15.5 | 0.009 | 2.69 | 10.8 |
| 31 | 49 | 17.4 | 153 | 1025 | +0.3 | +0.4 | 1153 | 4768 | 15.2 | 0.009 | 2.52 | 10.0 |
| 32 | 48 | 17.3 | 142 | 992 | +0.4 | +0.6 | 1187 | 4529 | 15.1 | 0.008 | 2.64 | 10.2 |
| 33 | 51 | 17.5 | 144 | 1034 | +0.2 | +0.4 | 1174 | 4614 | 14.9 | 0.008 | 2.51 | 10.4 |
| 34 | 53 | 16.9 | 149 | 1021 | +0.3 | +0.5 | 1129 | 4659 | 14.7 | 0.008 | 2.46 | 9.8 |
| 35 | 49 | 16.8 | 151 | 1031 | +0.2 | +0.4 | 1043 | 4793 | 14.5 | 0.008 | 2.42 | 9.7 |
| 36 | 47 | 16.4 | 154 | 1063 | +0.1 | +0.4 | 1114 | 4829 | 13.9 | 0.006 | 2.48 | 9.5 |

As can be seen from the above results, compared to the Comparative Examples that have a smaller long-axis standard geometrical deviation Lσg and short-axis standard geometrical deviation Dσg, the inventive Examples exhibit large Lσg and Dσg values that make it possible to obtain media having lower surface roughness and improved surface smoothness. Moreover, using a method whereby not more than 80 mass % of the material is taken out and crushed repeatedly makes it possible to obtain a particle size distribution having large X and Y values of 0.5 or more, which improves the surface smoothness and the related characteristics (Examples 1 to 3 and Comparative Examples 1 and 2).

More specifically, when the crushing power of an atomizer is changed, the size distribution change can be confirmed by comparing Examples 1 and 3 and Comparative Examples 1 and 2. A comparison of Examples 1 and 3 and Comparative Example 2 shows that the standard geometrical deviation can be moved into a desired range by lengthening the time the crushing power is increased, and particles that are in that range can be used to form a lower monolayer having excellent surface smoothness.

Comparative Example 1 shows the result of always crushing at high power, which is that while the standard geometrical deviation cited in the literature is exhibited, there is a slight degradation in terms of the smoothness of the medium.

A comparison of Examples 1, 3 and 4 reveals differences that are based on the crushing machine used, and indicates that atomizers produce the best results, followed by roll mills and pulverizers, which exhibit roughly the same characteristics.

Comparative Example 3 shows what happens when take-out is not used. Particles thus not subjected to take-out crushing break mainly along the long axis and do not collapse, so they exhibit low standard geometrical deviation values. However, the surface smoothness thereof is slightly inferior to that of the material obtained by the present invention.

What is claimed is:

1. Iron compound powder consisting of non-magnetic particles for a non-magnetic layer of a coating type magnetic recording medium, which has a standard geometrical deviation in a long axis of greater than 1.5, wherein the standard geometrical deviation of the long axis is that obtained by the measurement of the long axis of the particles using a transmission electron microscope image of the particles, and which satisfies the following equation (1)

(cumulative number of particles having a long-axis length of not more than L/2)/(cumulative number of particles having a long-axis length of not more than 2L)≧0.5,  (1)

wherein L is average length in nanometers of the long axis of the particles used for the measurement of the standard geometrical deviation in the long axis using transmission electron microscopy.

2. Iron compound powder consisting of non-magnetic particles for a non-magnetic layer of a coating type magnetic recording medium, which has a standard geometrical deviation in a short axis of greater than 1.35, wherein the standard geometrical deviation of the short axis is that obtained by the measurement of the short axis of the particles using a transmission electron microscope image of the particles, wherein (cumulative number of particles having a short-axis length of not more than D/2)/(cumulative number of particles having a short-axis length of not more than 2D)≧0.5,  (2)

wherein D is average length in nanometers of the short axis of the particles used for the measurement of the standard geometrical deviation in the long axis using transmission electron microscopy.

3. Iron compound powder of non-magnetic particles for a non-magnetic layer of a coating type magnetic recording medium, which has a standard geometrical deviation in a long axis of greater than 1.5 and a standard geometrical deviation in a short axis of greater than 1.35, wherein the standard geometrical deviations of the long and short axes are those obtained by the measurement of the long and short axes of the particles using a transmission electron microscope image of the particles, and which satisfies the following equations (1) and (2)

(cumulative number of particles having a long-axis length of not more than L/2)/(cumulative number of particles having a long-axis length of not more than 2L)≧0.5, (1)

wherein L is average length in nanometers of the long axis of the particles used for the measurement of the standard geometrical deviation in the long axis using transmission electron microscopy, and (cumulative number of particles having a short-axis length of not more than D/2)/(cumulative number of particles having a short-axis length of not more than 2D)≧0.5, (2)

wherein D is average length in nanometers of the shod axis of the particles used for the measurement of the standard geometrical deviation in the long axis using transmission electron microscopy.

4. Iron compound powder of particles according to claim 1 wherein the iron compound particles contain rare earth elements (including Y).

5. Iron compound powder of particles according to claim 1 wherein the iron compound particles contain P.

6. Iron compound powder of particles according to claim 1 wherein the iron compound particles are hematite.

7. A magnetic recording medium using the iron compound particles according to claim 1.

8. Iron compound powder of particles according to claim 2 wherein the iron compound particles contain rare earth elements (including Y).

9. Iron compound powder of particles according to claim 2 wherein the iron compound particles contain P.

10. Iron compound powder of particles according to claim 2 wherein the iron compound particles are hematite.

11. A magnetic recording medium using the iron compound particles according to claim 2.

* * * * *